(12) United States Patent
Strauser

(10) Patent No.: US 9,425,651 B2
(45) Date of Patent: Aug. 23, 2016

(54) STAGGERED CHARGING SYSTEM

(71) Applicant: Jack Strauser, Seminole, FL (US)

(72) Inventor: Jack Strauser, Seminole, FL (US)

(73) Assignee: DOK SOLUTION LLC, Largo, FL (US)

(*) Notice: Subject to any disclaimer, the term of this patent is extended or adjusted under 35 U.S.C. 154(b) by 399 days.

(21) Appl. No.: 14/134,227

(22) Filed: Dec. 19, 2013

(65) Prior Publication Data

US 2014/0106609 A1 Apr. 17, 2014

Related U.S. Application Data

(63) Continuation-in-part of application No. 13/345,994, filed on Jan. 9, 2012, now Pat. No. 8,675,356, which is a continuation-in-part of application No. 13/373,076, filed on Nov. 3, 2011, now Pat. No. 8,593,802, and a continuation-in-part of application No. 12/699,078, filed on Feb. 3, 2010, now Pat. No. 8,116,077, which is a continuation-in-part of application No. 11/676,850, filed on Feb. 20, 2007, now Pat. No. 7,742,293.

(51) Int. Cl.
G06F 1/16 (2006.01)
H05K 5/00 (2006.01)
H05K 7/00 (2006.01)
H02J 11/00 (2006.01)
H02J 7/00 (2006.01)

(52) U.S. Cl.
CPC .............. *H02J 11/00* (2013.01); *G06F 1/1632* (2013.01); *H02J 7/0027* (2013.01); *H02J 2007/0062* (2013.01)

(58) Field of Classification Search
CPC .................................................. G06F 1/1632
USPC .............. 361/679.4, 679.41, 679.44, 679.42, 361/679.43; 312/223.1–223.3
See application file for complete search history.

(56) References Cited

U.S. PATENT DOCUMENTS

| | | | |
|---|---|---|---|
| 6,524,240 B1 | 2/2003 | Thede | |
| D513,938 S | 1/2006 | Griffin | |
| 7,399,198 B2 * | 7/2008 | Thalheimer | H04R 5/02 439/501 |
| D579,443 S | 10/2008 | Donovan et al. | |
| D589,930 S | 4/2009 | McGeeney | |
| D595,722 S | 7/2009 | Miyawaki | |
| D600,251 S | 9/2009 | Poandl | |
| 7,719,830 B2 * | 5/2010 | Howarth | G06F 1/1632 312/223.2 |
| 7,840,740 B2 | 11/2010 | Minoo | |
| 7,853,745 B2 | 12/2010 | Muraki | |
| 8,054,042 B2 | 11/2011 | Griffin et al. | |
| 8,115,451 B2 | 2/2012 | Griffin et al. | |
| 8,195,114 B2 | 6/2012 | Krampf et al. | |
| 8,311,256 B1 | 11/2012 | Strauser | |
| 8,320,597 B2 | 11/2012 | Griffin et al. | |

(Continued)

*Primary Examiner* — Anthony Haughton
(74) *Attorney, Agent, or Firm* — Larson & Larson, P.A.; Frank Liebenow; Patrick Reid

(57) ABSTRACT

A consumer electronic system for holding and providing power to any number of consumer electronic devices includes any number of cradles in a staggered configuration, such that, displays of consumer electronic devices in each of the cradles are each visible without being substantially blocked by other consumer electronic devices. In one embodiment, the consumer electronic system for holding and providing power comprises multiple sub-systems, each having one or more cradles, such that, the sub-systems are joined to produce a consumer electronic system for holding and providing power to the desired number of possible consumer electronic devices at one time.

12 Claims, 7 Drawing Sheets

(56) References Cited

U.S. PATENT DOCUMENTS

| | | |
|---|---|---|
| 8,366,480 B2 | 2/2013 | Neu et al. |
| 8,477,953 B2 | 7/2013 | Hobson et al. |
| 2004/0150944 A1 | 8/2004 | Byrne et al. |
| 2006/0013411 A1 | 1/2006 | Lin |
| 2006/0116009 A1 | 6/2006 | Langberg et al. |
| 2006/0127034 A1 | 6/2006 | Brooking et al. |
| 2006/0181840 A1 | 8/2006 | Cvetko |
| 2006/0221776 A1 | 10/2006 | Roman et al. |
| 2006/0250764 A1 | 11/2006 | Howarth et al. |
| 2007/0058332 A1 | 3/2007 | Canterbury et al. |
| 2007/0291475 A1 | 12/2007 | Heathcock |
| 2008/0307144 A1 | 12/2008 | Minoo |
| 2009/0009957 A1 | 1/2009 | Crooijmans et al. |
| 2009/0129010 A1 | 5/2009 | Park et al. |
| 2009/0295328 A1 | 12/2009 | Griffin, Jr. |
| 2010/0195279 A1 | 8/2010 | Michael |
| 2011/0216495 A1 | 9/2011 | Marx |
| 2012/0106069 A1 | 5/2012 | Strauser |

* cited by examiner

STAGGERED CHARGING SYSTEM

CROSS-REFERENCE TO RELATED APPLICATION

This application is a continuation-in-part of U.S. patent application Ser. No. 13/345,994, filed Jan. 9, 2012; which in turn is a continuation-in-part of U.S. patent application Ser. No. 12/699,078, filed Feb. 3, 2010; which in turn is a Continuation-in-Part of U.S. patent application Ser. No. 11/676,850 filed Feb. 20, 2007, now U.S. Pat. No. 7,742,293, the disclosures of the above are hereby incorporated by reference. This application is also a continuation-in-part of U.S. patent application Ser. No. 13/373,076, filed Nov. 3, 2011. This application is related to U.S. application Ser. No. 13/346,018 filed Jan. 9, 2012.

FIELD

This invention relates to the field of consumer electronic devices and more particularly to a system for supporting multiple consumer electronic devices while the consumer electronic devices are, for example, in use and/or charging.

BACKGROUND

Many consumer electronic devices are powered by an internal rechargeable battery and, to recharge the battery, the consumer electronic devices are connected to an external source of electrical power while an internal circuit controls charging of the internal rechargeable battery.

One recharging system includes what is often referred to as a "wall wart." A "wall wart" is typically a sealed transformer and/or power conditioning circuit connected to an typical A/C plug (approximately 117 VAC in the USA). Conditioned power from the wall wart is transferred to the consumer electronic device through a cable and a cable connector. The connector mates with a corresponding connector on the consumer electronic device. For example, many new smart phones have miniature USB connectors. These miniature USB connectors mate with male miniature USB connectors at an end of a power cable, in turn connected to a wall wart that provides conditioned 5 VDC power. This method of charging functions but causes clutter; particularly when users have multiple devices. Additionally, each wall wart that remains plugged into A/C power drains a small amount of A/C power even when not charging the consumer electronic devices. Users often disconnect their device after charging but fail to unplug their wall wart from the A/C power outlet. This results in a waste of energy.

Lately, there has been a movement to standardize on a voltage of 5 VDC as provided with the Universal Serial Bus standard. This standard would apply whether power was provided through a miniature USB connector or through a proprietary connector, as is at times found on some cellular phones. Suppliers of consumer electronic devices often provide a cable having a standard USB connector at one end for connecting to a 5 VDC source, and a mating connector for connecting to the consumer electronic device at the other end. The user is able to obtain 5 VDC power for the standard USB connector at many sources, such as: wall warts that have a female standard USB connector, computer systems with USB ports, airport charging stations, female USB connectors in vehicles, etc. Still, many find use the wall wart that is usually included with their device, leaving the wall wart plugged into A/C power for longer than needed.

There are cradles for holding consumer electronic devices and, optionally, use while charging. Some of the cradles use the wall wart provided with the consumer electronic devices. Others have their own power source. There are times when a user wishes to use the device while charging. For example, one may wish to watch a movie on some consumer electronic devices while the consumer electronic device is in a cradle. Some such cradles include integrated connectors for directly connecting to the consumer electronic devices, making such cradles dedicated to one or a small family of consumer electronic devices. Other cradles provide a cable for connection to the consumer electronic devices.

There are chargers that have multiple USB female connectors for concurrently charging multiple consumer electronic devices through cables. In such, the devices are not typically held or supported in any particular position.

Recently, several manufacturers have created home entertainment systems that have one or more charging stations that connect to the consumer electronic devices; some having cradles to support the consumer electronic devices. Home entertainment systems already use some "parasitic" power to maintain clocks (time of day) and maintain a standby state waiting for a command from a remote control. Therefore, since such devices already use a small amount of "parasitic" power, there is little or no additional power used to make those devices ready to power/charge the consumer electronic devices.

Such entertainment systems sometimes include a docking port for one particular consumer electronic device such as a docking port for one particular manufacturer's digital music player. In some entertainment systems, a consumer electronic device rests in and plugs into a fixed connector. In such, if the manufacturer of such devices releases newer products with a different connector type or connector position, the entertainment system is no longer useful for the new devices and a different entertainment system is needed for the new devices. This recently occurred with a major phone manufacturer which changed the connector type on all new phones and, those who had entertainment systems that supported and charged the old style phone found these entertainment systems to be obsolete after upgrading to the new phone.

In modern times, many individuals and families own multiple devices that need charging several times per week. For example, on any given day, a single person owning a smart phone, digital music player, and a tablet PC will find a need to charge one or more of these consumer electronic devices. There are charging stations that accept multiple devices, having cradles for smaller devices such as smart phones, yet requiring larger consumer electronic devices (e.g. tablet PCs) to rest on a horizontal surface. There are many drawbacks to resting consumer electronic devices horizontally including, but not limited to, increasing the risk of damage from setting heavy objects on the larger consumer electronic device's display, splatter from nearby sources of liquids (e.g., sinks), increased dust adhesion, fluid penetration from a nearby spill, etc.

Some recent consumer products include charging ports and locations for holding one or more consumer electronic devices. There are many amplified speaker systems or clock radio systems that include a cradle with or without an integrated connector for one particular consumer electronic device. These consumer electronic devices generally support exactly one consumer electronic device.

There are several problems with prior consumer electronic systems that support one or more consumer electronic devices. Many or all such consumer electronic systems support consumer electronic i-devices (e.g. those made by a particular manufacturer that names their products starting with an "i") from only a single manufacturer. Many or all such consumer electronic systems support only a small, very limited size range of consumer electronic devices, typically only one or a small subset of all possible consumer electronic devices such as only one i-device. Many or all such consumer electronic systems do not support larger consumer electronic devices such as tablet computers. Many or all such consumer electronic systems do not concurrently support smaller consumer electronic devices concurrently while supporting larger consumer electronic devices such as tablet computers. Many or all such consumer electronic systems do not provide proper physical support for larger consumer electronic devices such as tablet computers. Many or all such devices do not allow viewing of each device's display while docked and charging.

What is needed is a system that will support and charge a mix of consumer electronic devices in a proper orientation.

SUMMARY

A consumer electronic system for holding and providing power to any number of consumer electronic devices has any number of cradles in a staggered configuration, such that, displays of consumer electronic devices in each of the cradles are each visible without being substantially blocked by other consumer electronic devices. In one embodiment, the consumer electronic system for holding and providing power comprises multiple sub-systems, each having one or more cradles, such that, the sub-systems are joined to produce a consumer electronic system for holding and providing power to the desired number of possible consumer electronic devices at one time.

In one embodiment, a consumer electronic sub-system is disclosed including an enclosure with one or more cradles formed in the enclosure. Each of the cradles has a cavity and a support wall. The cavity sized to contain at least one portion of at least a first consumer electronic device and each of the support walls are sized for supporting a consumer electronic device. A first surface of the enclosure has a forward connector for connection to other consumer electronic sub-systems and a second surface of the enclosure has a rearward interface connector for connection to either power or connection to another consumer electronic sub-system. There are one or more power ports; each power port is associated with one of the cradles.

In another embodiment, a method of charging a consumer electronic device is disclosed including providing two consumer electronic sub-system. Each consumer electronic sub-system has an enclosure with one or more cradles formed in the enclosure. Each of the cradles has a cavity and a support wall. The cavity is sized to contain at least one portion of at least a first consumer electronic device and each of the support walls is for supporting a consumer electronic device. A first surface of the enclosure has a forward interface connector for connecting to other consumer electronic sub-systems and a second surface of the enclosure has a rearward interface connector for connecting to either power or connection to another consumer electronic sub-system. One or more power ports are included, one power port for each of the cradles. The method includes connecting the rearward interface connector of a first consumer electronic sub-system of the two consumer electronic sub-systems to the forward interface connector of a second consumer electronic sub-system of the two consumer electronic sub-systems and connecting a power supply to the rearward interface connector of the second consumer electronic sub-system, then connecting one end of power cables to each of one or more consumer electronic devices and a distal end of each of the power cables to one of the one or more power ports for charging the consumer electronic devices.

In another embodiment, a consumer electronic device charging system is disclosed including two consumer electronic sub-system. Each consumer electronic subsystem has an enclosure with one or more cradles formed in the enclosure. Each of the cradles has a cavity and a support wall. The cavity is sized to contain at least one portion of at least a first consumer electronic device and each of the support walls is for supporting a consumer electronic device. A first surface of the enclosure has a forward interface connector for connecting to other consumer electronic sub-systems and a second surface of the enclosure has a rearward interface connector for connecting to either power or connection to another consumer electronic sub-system. One or more power ports are included, one power port for each of the cradles. The rearward interface connector of a first consumer electronic sub-system of the two consumer electronic sub-systems is connected to the forward interface connector of a second consumer electronic sub-system of the two consumer electronic sub-systems; and a power supply is connected to the rearward interface connector of the second consumer electronic sub-system.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
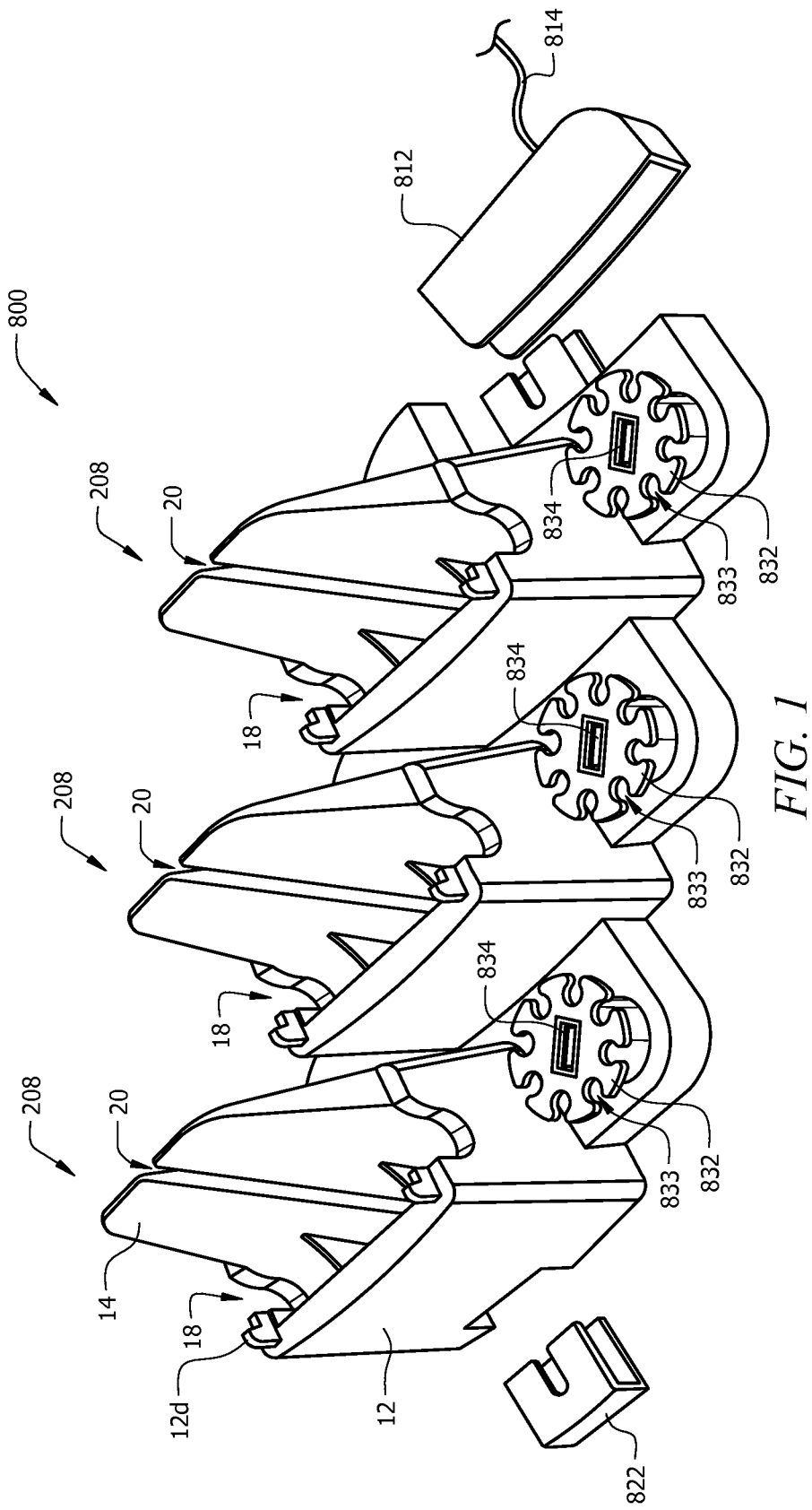
FIG. 1 illustrates a perspective view of a consumer electronic sub-system having multiple consumer electronic device cradles.

Reference will now be made in detail to the presently preferred embodiments of the invention, examples of which are illustrated in the accompanying drawings. Throughout the following detailed description, the same reference numerals refer to the same elements in all figures.

Throughout this description, the term, "consumer electronic device" refers to devices such as digital music players (i-devices, MP3 players, etc.), digital media players (e.g., MP4 players, movie players), cellular phones (e.g., smart phones, i-phones), portable Global Positioning Satellite (GPS) devices, tablet computing devices (e.g. i-tablet computers, etc.). Any portable consumer electronic device is anticipated, whether or not the consumer electronic device has an internal rechargeable power source. Some consumer electronic devices have persistent storage for storing audio content (music) or video content (movies) such as a micro-hard disk or flash memory. Under user control, these files are retrieved, uncompressed and converted to audio and/or video. The analog audio signal is often emitted in a 3.5 mm stereo headphone jack for the user to connect headphones or other reproduction devices. Some devices have a specialized data/power connector for connecting to a source of power and/or transferring data (e.g. music) to/from the consumer electronic device. Many consumer electronic devices have graphical displays.

Throughout this description, the term, "consumer electronic system" refers to systems that supports/holds and optionally charges consumer electronic device. Consumer electronic systems optionally perform other functions such as amplifying audio and presenting the audio through speakers, displaying the time, clock radio functions, etc.

Throughout this description, the term, "USB port" refers to an industry standard interface port, commonly known as "Universal Serial Bus." This particular port has become ubiquitous for many applications and uses, many of which do not utilize the integrated high-speed serial interface, and, instead, use only the standard power connection for powering of devices connected to the USB ports (e.g., digital music players, smart phones . . . ). Although the specific term, "USB" is used throughout this description and drawings, the invention and claims are not limited to any particular port or type of port, nor limited to using such port for power only, power and communications, or communications only.

Figure 2:
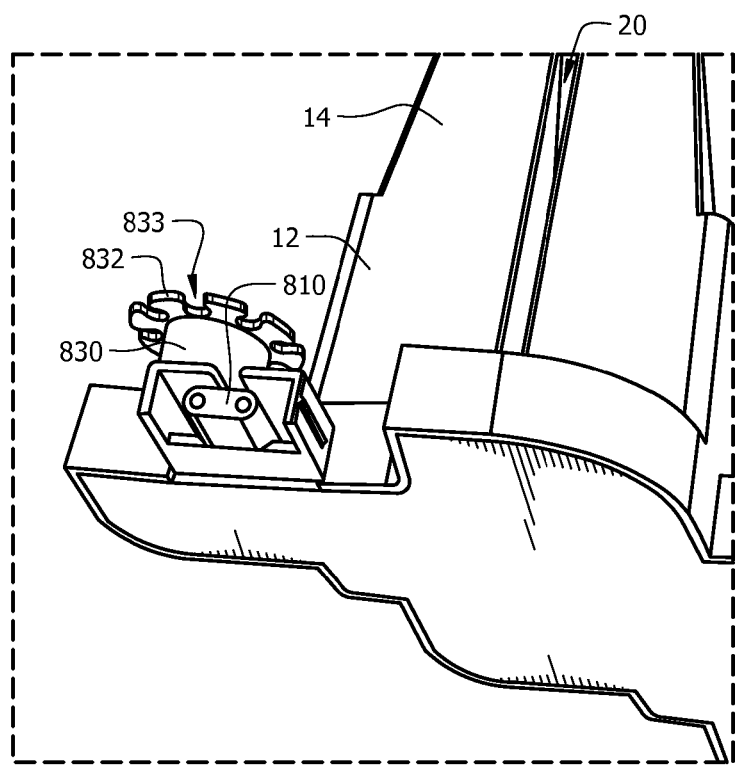
FIG. 2 illustrates a perspective view of a first typical connector of the consumer electronic sub-system having multiple consumer electronic device cradles.
Figure 3:
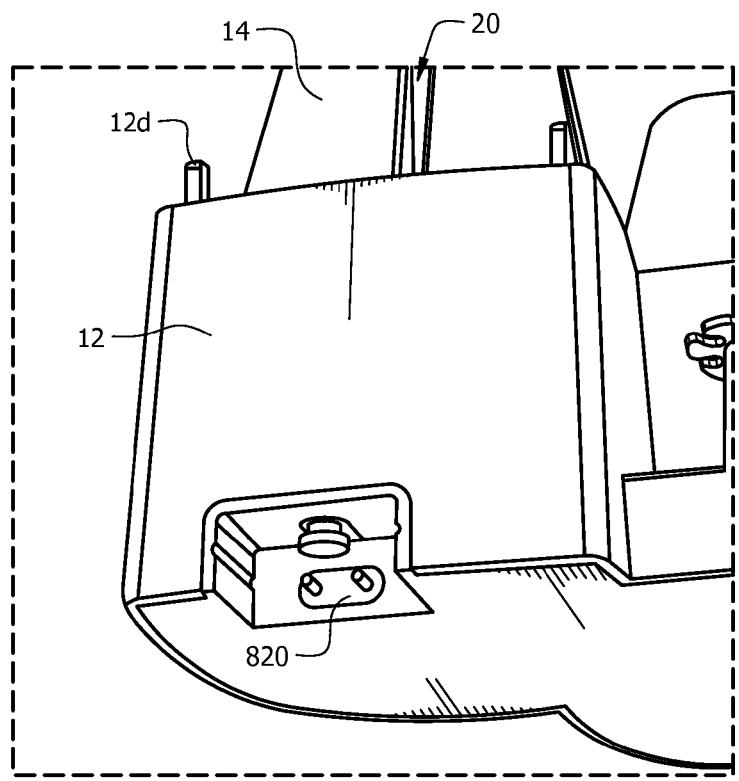
FIG. 3 illustrates a perspective view of a second typical connector of the consumer electronic sub-system having multiple consumer electronic device cradles.

Referring to FIGS. 1, 2, and 3, perspective views of a consumer electronic sub-system 800 having multiple consumer electronic device cradles is shown. In this example, the consumer electronic sub-system 800 is shown having three cradles, although any number of cradles is anticipated, including, but not limited to one cradle. Each cradle has a support wall 14 for resting a consumer device 850/852/854 (see FIG. 5) against such. For smaller consumer devices 850, an end of the consumer device rests within the cavity 18. Each support wall 14 has a gap 20 for cable routing. Although not required, it is preferred that the gap 20 continue to the bottom of the cavity 18 such that, when consumer devices that have bottom edge connectors rest in the cavity 18, the cable 902 (see FIG. 5) is easily routed out through the gap 20.

Figure 5:
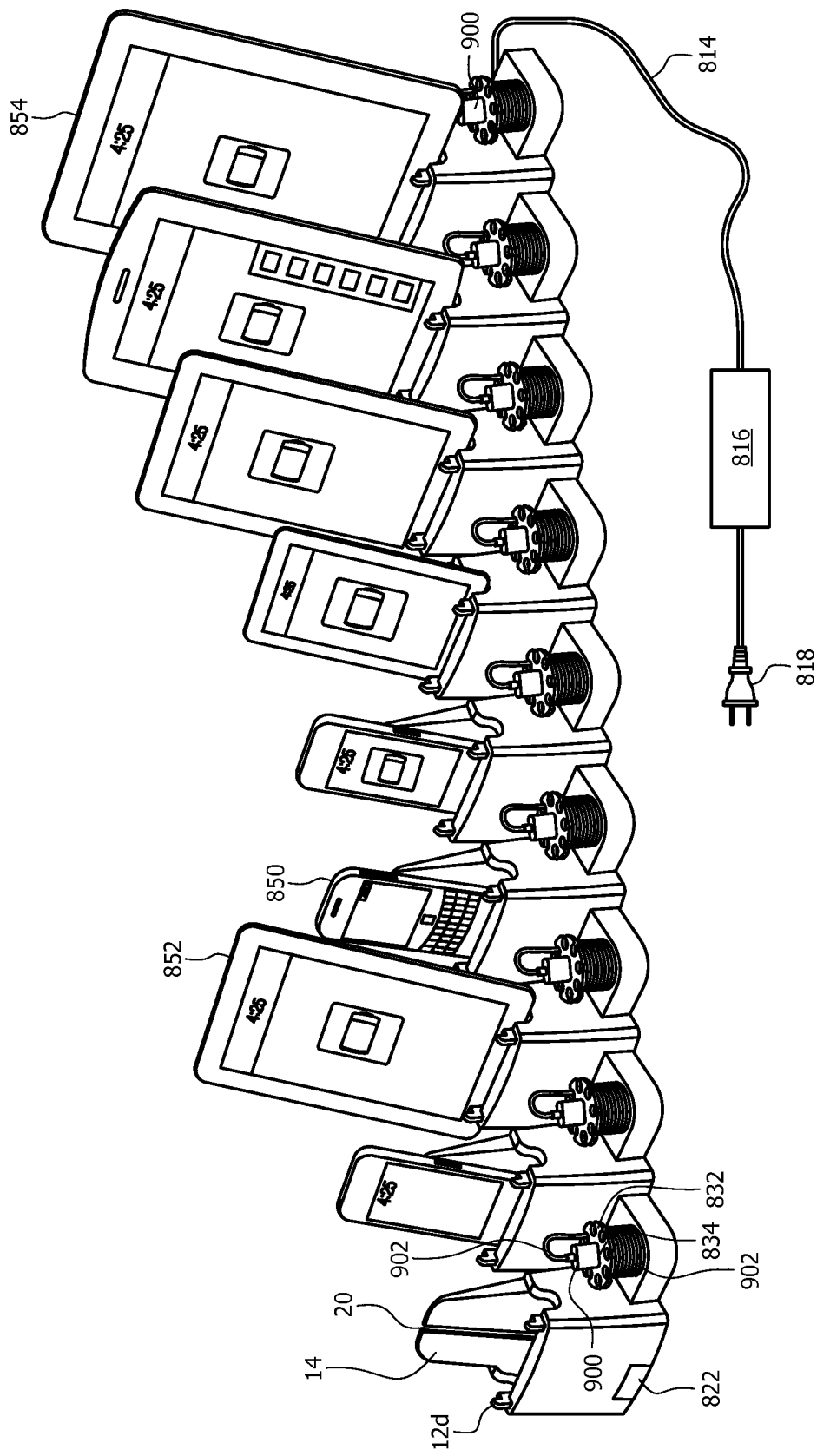
FIG. 5 illustrates a perspective view of several consumer electronic sub-systems having multiple consumer electronic device cradles connected together and having devices held during charging.

In some embodiments, cable management is provided, preferably through a wire spool 830 (see FIG. 2). In the example shown, the wire spool 830 has a cap 832 with one or more cable clips 833 around a periphery of the cap 832. In use (as shown in FIG. 5) a host-end of the device cable 902 is wrapped around the wire spool 832 then fed through one of the cable clips 833 to maintain such wrapping, and plugged into a USB port 834 that, in this example, is positioned on the cap 832. Note, in alternate embodiments, other locations for the USB port 834 are anticipated, including locations on the body 12.

In a preferred embodiment, nubs 12d are located on the base at the top-front of each cavity. The nubs 12d provide support to larger consumer electronic devices 852/854.

Although not required, it is preferred that each cradle be staggered as shown. Such staggering provides visibility of each consumer electronic device's display while charging. Note, that it is also anticipated that, other than charging, the consumer electronic sub-systems 800 also include data connections on the USB ports 834 and, in some embodiments, provide USB hub functionality (not shown) in support of data connection while the consumer electronic devices 850/852/854 are charging. In such, the interface connectors 810/820 (shown in FIGS. 2 and 3) include data connections as well as power connections.

At one end of the consumer electronic sub-system 800 is a forward connector 810 and at a different end of the consumer electronic sub-system 800 is a backward interface connector 820. A perspective view of the forward connector 820 of the consumer electronic sub-system 800 is shown in FIG. 3 and a perspective view of a backward connector 810 of the consumer electronic sub-system 800 is shown in FIG. 2. Although shown as specific types of connector with specific male/female relationship, any type of connector is anticipated with any orientation of male/female pins. Any fashion of consumer electronic sub-system 800 interconnection support structure is anticipated, including the structure shown in the figures.

As shown in FIG. 1, a cover 822 is optionally placed over the forward connector 820 of the front of the consumer electronic sub-system 800 for aesthetic reasons and to protect the forward connector 820. Also shown in FIG. 1 is a power connector 812 connected to a power source 816 (see FIG. 5) by a power cable 814. The power connector 812 interfaces with the rearward interface connector 810. One or more consumer electronic sub-system 800 are combined to complete a charging system (see FIGS. 4 and 5) having as many charging cradles 208 as desired, installing the optional cover 822 over the forward connector 820 of the front-end consumer electronic sub-system 800 and connecting power to the rearward connector 810 of the end consumer electronic sub-system 800 as shown in FIG. 4.

Figure 4:
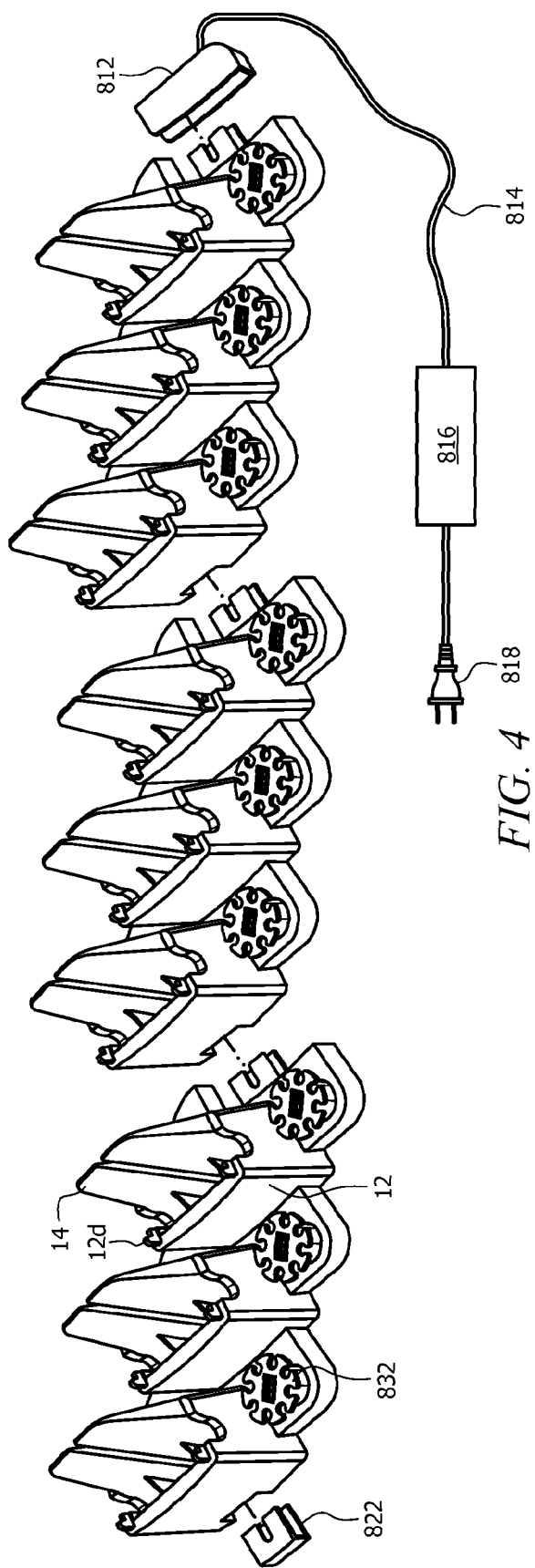
FIG. 4 illustrates a perspective view of connecting several consumer electronic sub-systems having multiple consumer electronic device cradles.

In FIG. 4, an exemplary power supply 816 is shown connected to the power connector 812 by a power cable 814. In this example, the power supply 816 receives A/C power from an industry standard power connector 818, though any type of A/C or D/C power connection is anticipated and there is no limitation as to how the power supply 816 connects to or receives power. In the example shown in FIGS. 4 and 5, three consumer electronic sub-systems 800 are combined to produce a nine-port charging system. As discussed prior, it is anticipated that each consumer electronic sub-system 800 have any number of cradles 208 and any number of consumer electronic sub-system 800 are combined, as needed, to create charging systems with from one to any number of cradles 208. Given such flexibility, a system with one cradle often requires less maximum power (e.g. 5 A at 5V or 25 W) than a system with nine cradles 208 (e.g. 25 W*9=225 W). For such reasons, it is anticipated that either the power supply 816 provide ample power for the largest anticipated charging system or multiple power supplies are offered, for example, one power supply 816 for a three-port charging system (e.g. 75 W), one power supply 816 for a six-port system (e.g. 150 W), and one power supply 816 for a nine-port system (e.g. 225 W).

In FIG. 5, several consumer electronic sub-systems 800 are shown, most of the cradles 208 holding/supporting a consumer electronic device 850/852/854. In such, the advantage of staggering of the cradles 208 at, approximately 45 degrees, is shown, in that, from the viewer's perspective, most or all of the displays of the consumer electronic devices 850/852/854 are visible. Without such optional, but preferred staggering, all or most of the displays of the second through last consumer electronic device 850/852/854 would be hidden by another consumer electronic device 850/852/854.

Also visible in FIG. 5 is the preferred cable spool caps 832 with cables 902 having the host-end plug 900 inserted into the USB port 834. The cable spool 832 is not visible, covered by multiple turns of the cables 902. The opposite end of the cables 902 have device plugs specific to one or more consumer electronic devices 850/852/854. The cables 902 are routed through the gaps 20, eliminating the need to have the cables drape out of the cavities 208 and, therefore, providing a more securely hold of the consumer electronic devices 850/852/854.

Figure 6:
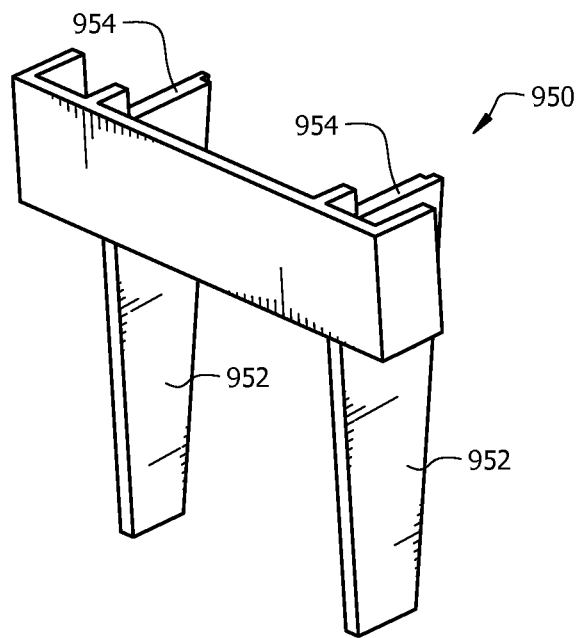
FIG. 6 illustrates a perspective view of a cradle insert.
Figure 7:
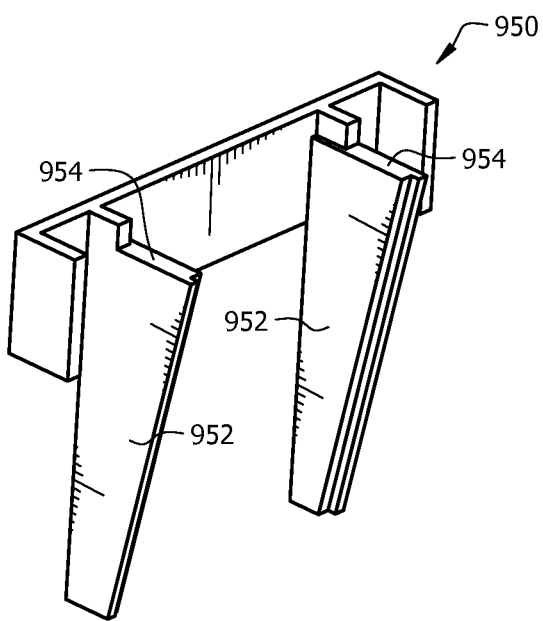
FIG. 7 illustrates a second perspective view of a cradle insert.

Referring to FIGS. 6 and 7, perspective views of a cradle insert 954 is shown. In a preferred embodiment, though not required, the bottom of the cavities 208 are rounded to conform to rounded bottoms of some consumer electronic devices 850/852/854 such as a cellular phone 850. Although it is anticipated that each cavity 208 have steps to accommodate progressively smaller consumer electronic devices 850/852/854 (see parent applications), the cradle inserts 954 provide a flat resting surface for some larger consumer electronic devices 850/852/854 such as tablets 852/854, especially consumer electronic devices 850/852/854 with flat or squared-off edges. Therefore, the cradle inserts 954 have an exposed edge 954 that is substantially flat, as shown. The cradle inserts have legs 952 that insert into the cavities 208 as shown in FIG. 9.

Figure 8:
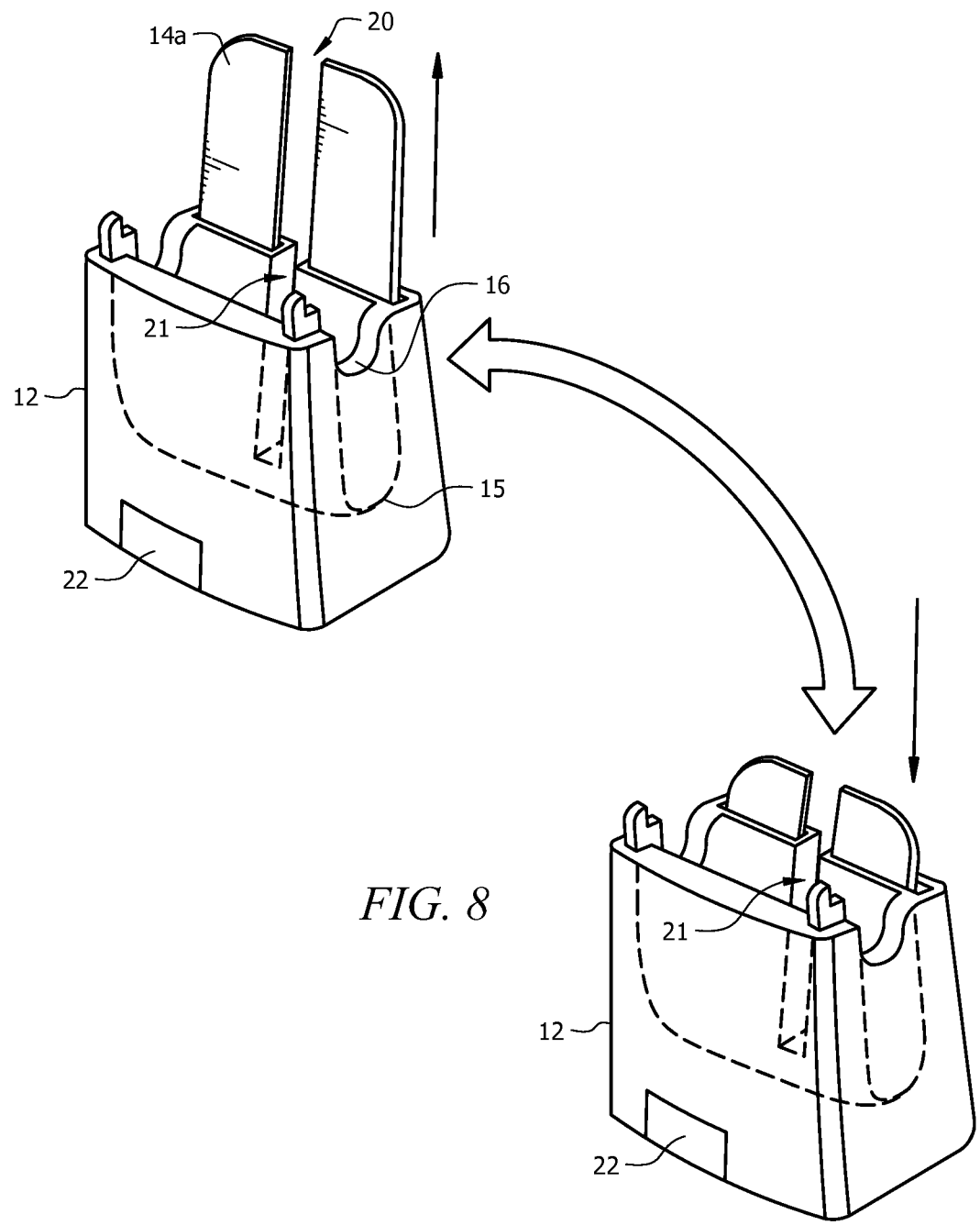
FIG. 8 illustrates a perspective view of the consumer electronic sub-systems having multiple consumer electronic device cradles with retractable support walls.
Figure 9:
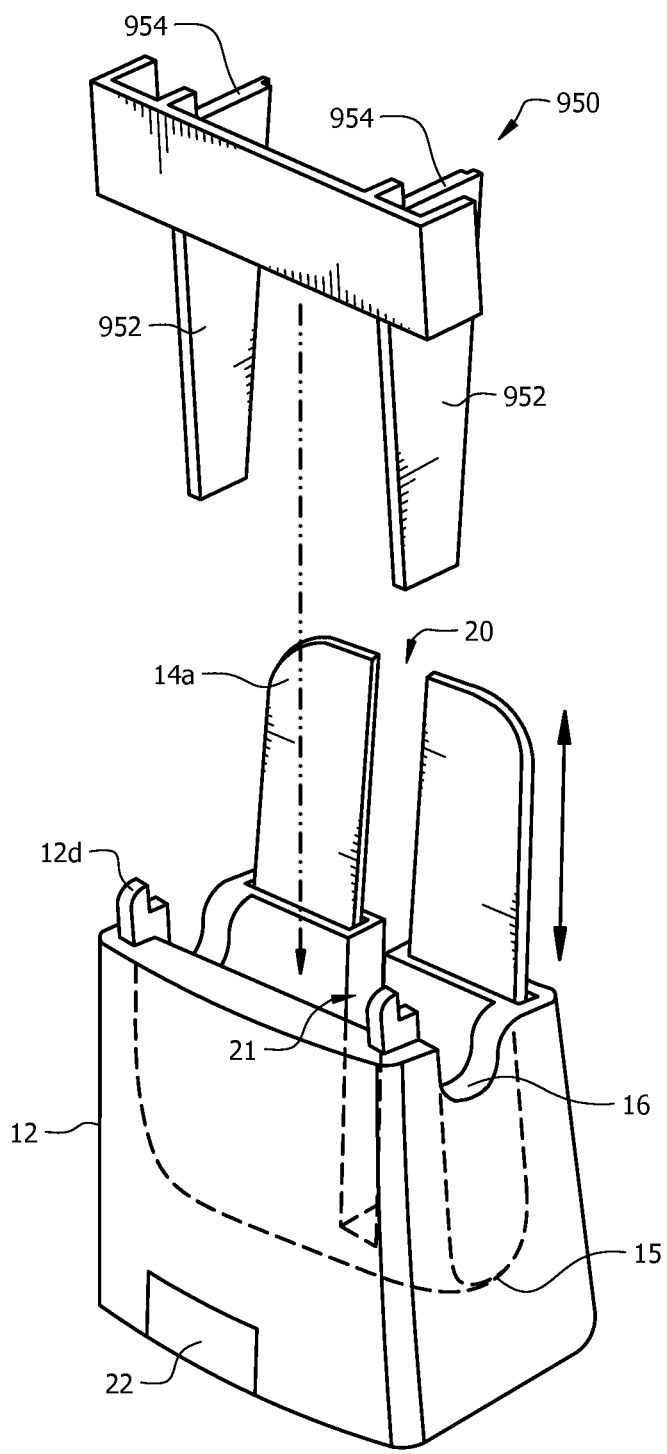
FIG. 9 illustrates a perspective view of the consumer electronic sub-systems having multiple consumer electronic device cradles with retractable support walls with insertion of the insert.

Referring to FIGS. 8 and 9, perspective views of the consumer electronic sub-systems having multiple consumer electronic device cradles 800 with retractable support walls 14a are shown. In FIG. 8, it is shown how the retractable support walls 14a extend and retract. The extended position is useful for larger sized consumer electronic devices 850/852/854 while the retracted position is useful for smaller consumer electronic devices 850/852/854 and to reduce product packaging volume, especially during storage, shipping, and marketing display. Note, in FIGS. 8 and 9, the preferably curved inside surfaces 15 and outside surface 16 of the cradle 208 are shown. In a preferred embodiment, the gap 20 in the retractable walls 14a continues as a continuation gap 21 in the base 12.

In FIG. 9, the cradle insert 950 is shown fitting inside the cradle 208.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of charging a consumer electronic device, the method comprising:
   providing two consumer electronic sub-system, each consumer electronic subsystem comprising:
   an enclosure;
   one or more cradles formed in the enclosure, each of the cradles having a cavity and a support wall, the cavity sized to contain at least one portion of at least a first consumer electronic device, each of the support walls for supporting a consumer electronic device;
   a first surface of the enclosure having a forward interface connector for connecting to other consumer electronic sub-systems;
   a second surface of the enclosure having a rearward interface connector for connecting to either power or connection to another consumer electronic sub-system; and
   one or more power ports, each of the one or more power ports associated with one of the cradles;
   connecting the rearward interface connector of a first consumer electronic sub-system of the two consumer electronic sub-systems to the forward interface connector of a second consumer electronic sub-system of the two consumer electronic sub-systems;
   connecting a power supply to the rearward interface connector of the second consumer electronic sub-system; and
   connecting one end of a power cable to each of one or more consumer electronic devices and a distal end of each of the power cables to one of the one or more power ports for charging the consumer electronic devices.

2. The method of claim 1, further comprising:
   inserting a cover over the forward interface connector of the first consumer electronic sub-system.

3. The method of claim 1, wherein each of the one or more cradles has a cable management spool, the method further comprising:
   winding each of the power cable around one of the cable management spools associated with the one of the one or more power ports to which the each power cable is connected.

4. A consumer electronic charging system comprising:
   two consumer electronic charging sub-systems, each electronic charging subsystem comprising:
   an enclosure;
   one or more cradles formed in the enclosure, each of the cradles having a cavity and a support wall, the cavity sized to contain at least one portion of at least a first consumer electronic device, each of the support walls for supporting a consumer electronic device;
   a first surface of the enclosure having a forward connector for connecting to other consumer electronic sub-systems;
   a second surface of the enclosure having a rearward interface connector for connecting to either power or connection to another consumer electronic sub-system; and
   one or more power ports, each of the one or more power ports associated with one of the cradles
   the rearward interface connector of a first consumer electronic sub-system of the two consumer electronic sub-systems connected to the forward interface connector of a second consumer electronic sub-system of the two consumer electronic sub-systems; and
   a power supply, the power supply connected to the rearward interface connector of the second consumer electronic sub-system.

5. The consumer electronic charging system of claim 4, wherein the support wall retracts to be substantially contained within the enclosure and extends to be substantially extended from the enclosure.

6. The consumer electronic charging system of claim 4, wherein the support wall has a slit for routing of a power cable from one of the power ports to a device held by the cradle.

7. The consumer electronic charging system of claim 4, further comprising at least one cable manager, each of the at least one cable managers corresponding to one of the cradles.

8. The consumer electronic charging system of claim 7, wherein each of the cable managers comprises a spool and a cap, each cap having one or more cable clips.

9. The consumer electronic charging system of claim 8, wherein each of the power ports is positioned on one of the caps.

10. The consumer electronic charging system of claim 4, wherein the at least one cradle is at least two cradles and each of the at least two cradles is staggered with respect to an adjacent cradle of the at least two cradles to reduce blockage of one a display of one of the consumer electronic devices by a different one of the consumer electronic devices.

11. The consumer electronic charging system of claim 4, wherein the power port is a universal serial port (USB port).

12. The consumer electronic charging system of claim 4, further comprising a cap covering the forward interface connector of the first consumer electronic sub-system.

* * * * *